United States Patent [19]

Nguyen

[11] Patent Number: 5,341,387
[45] Date of Patent: Aug. 23, 1994

[54] VITERBI DETECTOR HAVING ADJUSTABLE DETECTION THRESHOLDS FOR PRML CLASS IV SAMPLING DATA DETECTION

[75] Inventor: Hung C. Nguyen, San Jose, Calif.

[73] Assignee: Quantum Corporation, Milpitas, Calif.

[21] Appl. No.: 936,759

[22] Filed: Aug. 27, 1992

[51] Int. Cl.⁵ .......................... H04L 1/00; G06J 1/00
[52] U.S. Cl. ........................................ 371/45; 371/43; 371/44; 371/46; 375/94; 375/101; 364/602; 364/724.01
[58] Field of Search ....................... 371/45, 37.3, 37.7, 371/38.1, 39.1, 40.2, 40.3, 41, 44, 43, 46, 21.4, 34, 37.8, 37.9; 341/100, 101, 106, 107; 364/602, 724.01; 360/40, 45, 46, 65; 375/11

[56] References Cited

U.S. PATENT DOCUMENTS

| | | | |
|---|---|---|---|
| 4,130,818 | 12/1978 | Snyder, Jr. | 340/146.1 |
| 4,504,872 | 3/1985 | Peterson | 360/40 |
| 4,571,734 | 2/1986 | Dolivo et al. | 375/18 |
| 4,644,564 | 2/1987 | Dolivo et al. | 375/18 |
| 4,847,871 | 7/1989 | Matsushita et al. | 375/94 |
| 4,905,254 | 2/1990 | Bergmans | 375/14 |
| 5,095,484 | 3/1992 | Karabed et al. | 371/30 |
| 5,185,747 | 2/1993 | Farahati | 371/43 |
| 5,228,061 | 7/1993 | Newby et al. | 375/94 |
| 5,243,605 | 9/1993 | Lekmine et al. | 371/43 |

OTHER PUBLICATIONS

Wood, Peterson, "Viterbi Detection of Class IV Partial Response on a Magnetic Recording Channel", *IEEE Trans. on Communications*, Vol. Com. 34 No. 5 May 1986, pp. 454–461.

Schmerbeck, Richetta, Smith, "A 27 MHz Mixed Analog/Digital Magnetic Recording Channel DSP Using Partial Response Signalling with Maximum Likelihood Detection" *Proc 1991 IEEE Int'l Solid State Circuits Conf.* pp. 136–137, 304, and pp. 96, 97, 256 Slide Supplement.

(List continued on next page.)

*Primary Examiner*—Robert W. Beausoliel, Jr.
*Assistant Examiner*—Dieu-Minh Le
*Attorney, Agent, or Firm*—David B. Harrison

[57] ABSTRACT

A Viterbi detector for a PR4,ML data channel includes a data sample input for receiving digital data samples from a source. Digital data samples are taken of data which has been coded in a predetermined data code format and which has been passed through a data degrading channel. A delay circuit delays the digital data samples received at the data sample input. A delay selector controls an output of the delay circuit in accordance with a feedback control bit value. An adder circuit combines data samples from the data sample input with delayed samples from the delay circuit to produce a sum. A threshold input receives programmable positive and negative data threshold values. A threshold selector puts out either the positive or the negative threshold values in accordance with a sign bit control value. A comparator compares the sum with a selected threshold value and puts out a logical value based upon comparison thereof. It includes Viterbi decision state logic for determining the sign bit control value, the feedback control bit value, and two raw data bits for each incoming data sample. A memory path circuit decodes a sequence of consecutive values of the raw data bits in accordance with a predetermined maximum likelihood trellis decode logic table related to the predetermined data code format and puts out a sequence of detected code bits.

13 Claims, 9 Drawing Sheets

OTHER PUBLICATIONS

Wood, Ahigrim, Hallarnasek, Swenson, "An Experimental Eight-Inch Disc Drive With 100 MBytes per Surface" *IEEE Trans. on Magnetics* vol. MAG.-20, No. 5, Sep. 1984 pp. 698-702.

Kobayashi, Tang, "Application of Partial-response Channel Coding to Magnetic Recording Systems," *IBM Journal of Research and Develop., Jul. 1970 pp. 368-375.*

Kobayashi, "Application of Probabilistic Decoding To Digital Magnetic Recording Systems" *IBM Journal of Research and Develop Jan. 1971, pp. 64-74.*

Dolivo, "Signal Processing of High-Density Digital Magnetic Recording" *Proc. 1989 IEEE VLSI and Computer Peripherals,* Hamburg, West Germany, May 1989 pp. 1-91 to 1-96.

Coker, Galbraith, Kerwin, Rae, Ziperovich, "Implementation of PRML in a Rigid Disk Drive" *IEEE Trans. on Magnetics,* vol. 27, No. 6, Nov. 1991.

Cideciyan, Dolivo, Hermann, Hirt, Schott, "A PRML System for Digital Magnetic Recording *IEEE Journal on Selected Areas of Communication,"* Vol. 10, No. 1, Jan. 1992, pp. 38-56.

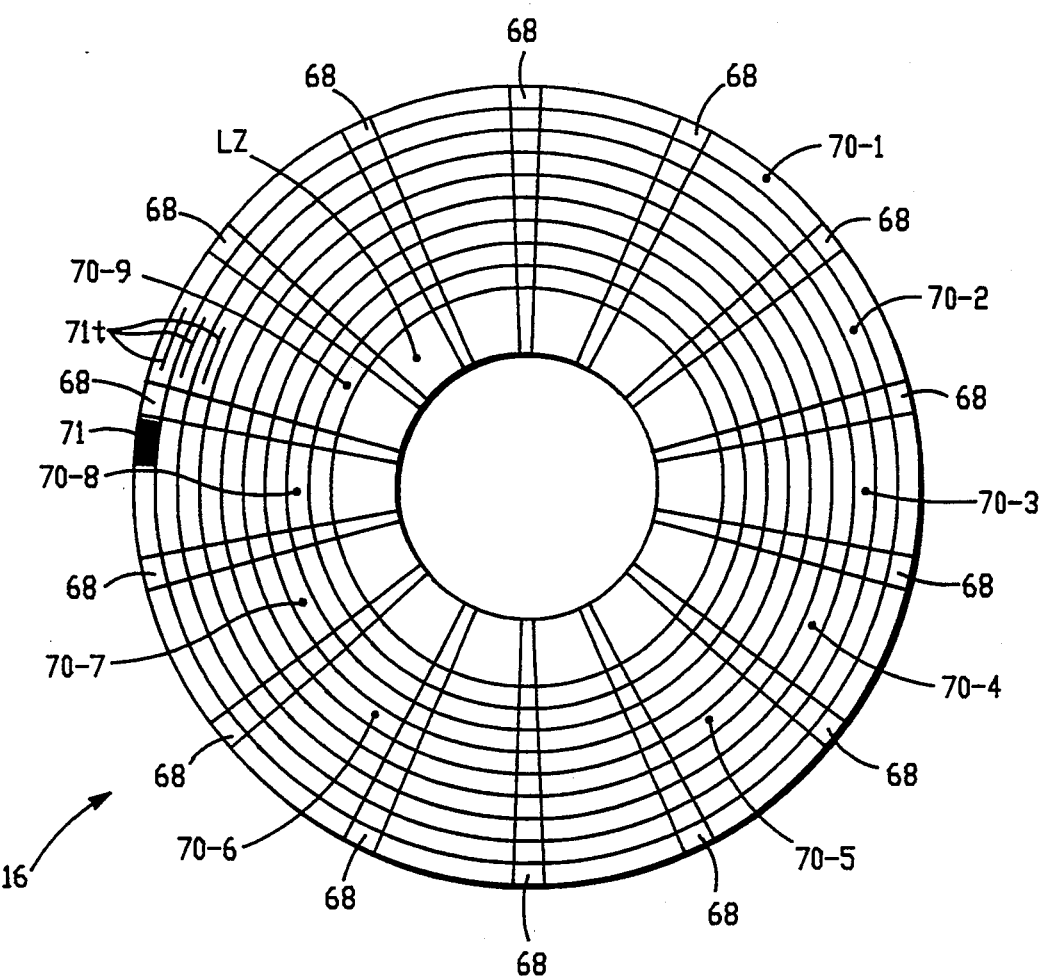
FIG.-5
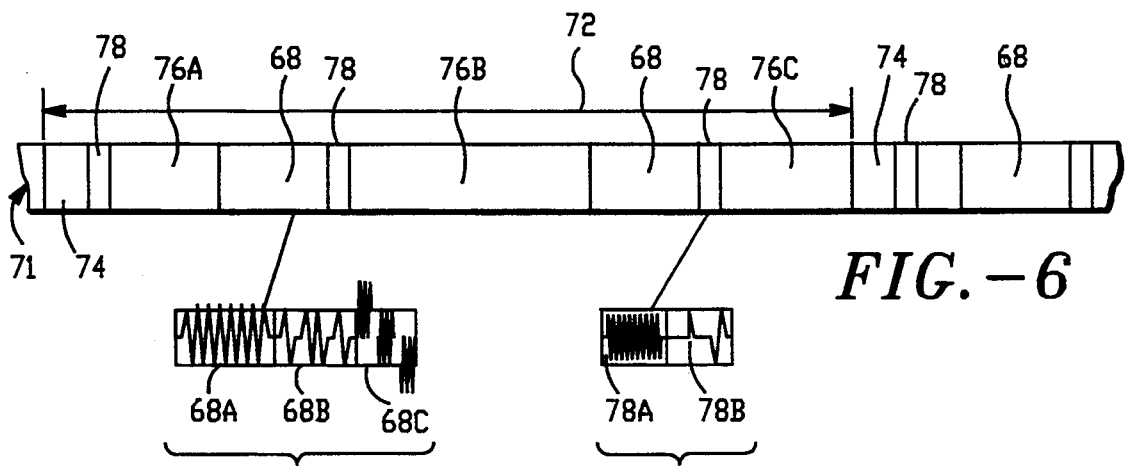
FIG.-6
FIG.-6A  FIG.-6B

| PRESENT STATE AIN | D=y(k)−y(k−M) | OUTPUTS | | | NEW STATE AOUT |
|---|---|---|---|---|---|
| | | da | db | ku | |
| 1 | D ≥ dkval | 0 | 0 | 1 | 0 |
| 1 | D ≤ 0 | 1 | 1 | 1 | 1 |
| 1 | 0 < D < dkval | 1 | 0 | 0 | 1 |
| 0 | D ≥ 0 | 0 | 0 | 1 | 0 |
| 0 | D ≤ dkvaln | 1 | 1 | 1 | 1 |
| 0 | dkvaln < D < 0 | 1 | 0 | 0 | 0 |

*FIG.−7*

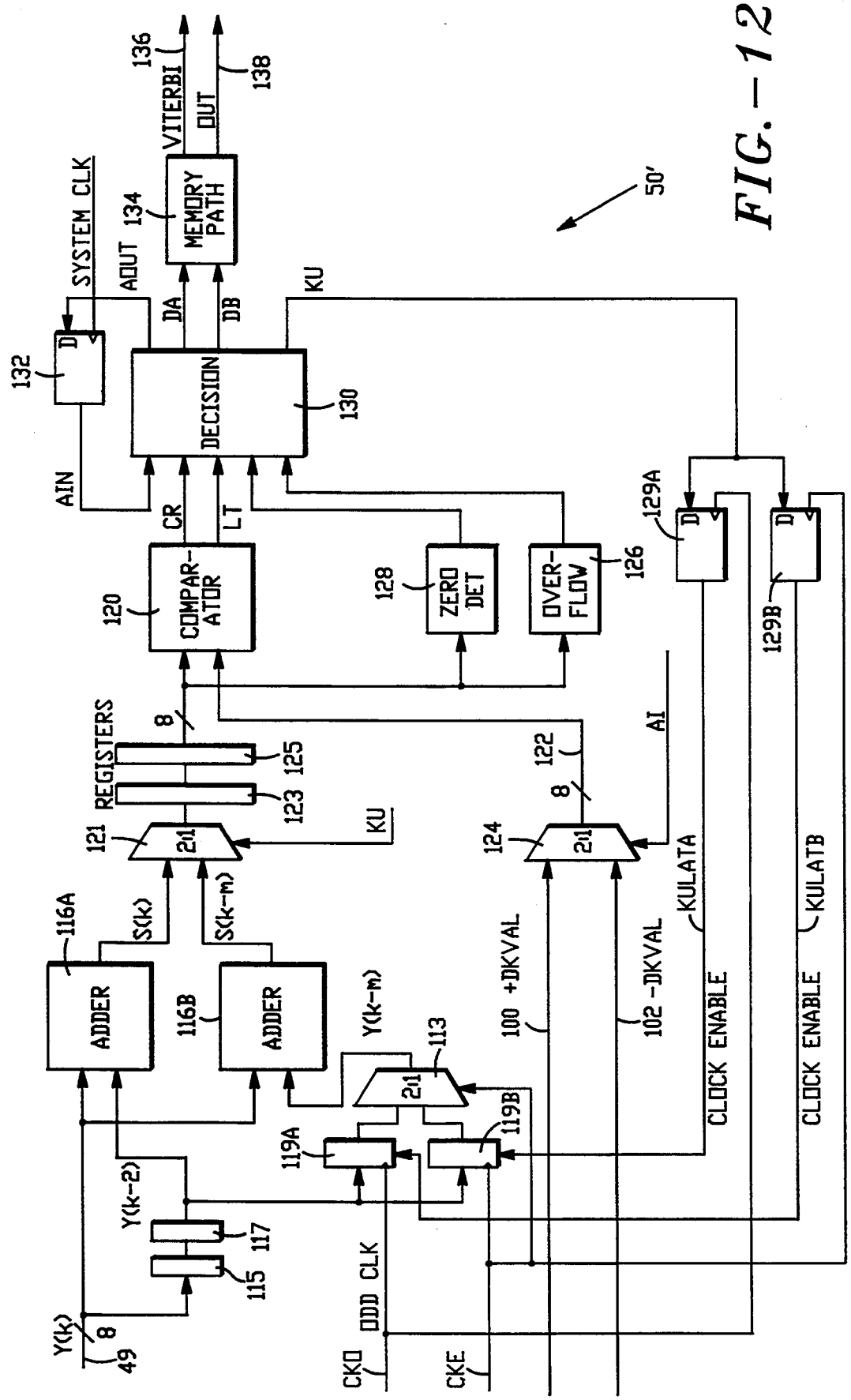

VITERBI DETECTOR HAVING ADJUSTABLE DETECTION THRESHOLDS FOR PRML CLASS IV SAMPLING DATA DETECTION

REFERENCE TO RELATED APPLICATION

The present invention is related to U.S. patent application Ser. No. 07/937,064 filed on Aug. 27, 1992 and entitled DISK DRIVE USING PRML CLASS IV SAMPLING DATA DETECTION WITH DIGITAL ADAPTIVE EQUALIZATION, the disclosure of which is hereby incorporated herein by reference.

FIELD OF THE INVENTION

The present invention relates to synchronized maximum likelihood detection of partial response 8/9ths coded data. More particularly, the present invention relates to a Viterbi Detector for a partial response, class IV, maximum likelihood (hereinafter referred to as "PR4,ML") data channel wherein the Viterbi detector has adjustable detection threshold levels.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. In this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code is generally thought of as a rate eight-ninths code, meaning that nine code bits are required for eight incoming data bits. (theoretically, the (0,4,4) code ratio is somewhat higher, approaching 0.961) Thus, this code is significantly more efficient than a rate two-thirds code, such as (1,7) RLL. Use of a (0,4,4) code results in a significantly greater net user data storage capacity on the disk surface, given a constant bit cell rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D=e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications*, vol. Com-34, No. 5, May 1986, pp. 434–461, authors Wood and Peterson explain the derivation of PR4 as being formed by subtracting waveforms two bit intervals apart, thereby forming an analog domain ternary "eve" pattern graphed herein in FIG. 2.

The Viterbi algorithm provides an iterative method of determining the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", *Proc. 1991 IEEE Internation Solid State Circuits Conference.* pp. 136–137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4,ML data channel from any need for handling of embedded servo information or for rapid resynchronization to the coded data stream following each embedded servo sector.

Prior Viterbi detector architectures and approaches applicable to processing of data sample sequences taken from a communications channel or from a recording device are also described in the Dolivo et al. U.S. Pat. No. 4,644,564. U.S. Pat. No. 4,504,872 to Peterson describes a digital maximum likelihood detector for class IV partial response signalling. The article by Roger W. Wood and David A. Peterson, entitled: "Viterbi Detection of Class IV Partial Response on a Magnetic Recording Channel" *IEEE Trans. on Comm.* Vol. Com-34, No. 5, May 1986, pp. 454–466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics*, Vol. Mag-20, No. 5, September 1984, pp 698–702 describes application of class IV partial response encoding and Viterbi detection techniques as applied within an experimental disk drive. A digital Viterbi detector capable of withstanding lower signal to noise ratios is described in Matsushita et al. U.S. Pat. No. 4,847,871. These documents are representative examples of the known state of the prior art.

When zoned data recording techniques, embedded servo sectors, and e.g. thin-film heads are employed in a high performance, very high capacity, low servo overhead disk drive, the prior approaches are not adequate, and a hitherto unsolved need has arisen for an approach incorporating PR4,ML techniques into a high capacity, high performance, low cost disk drive architecture including architectural features such as e.g. thin-film heads, embedded sector servo based head positioning, and zone-data-recording techniques.

With typical Viterbi detector designs of the prior art, several drawbacks have arisen. One drawback is that the clock frequency of the detection system will decrease significantly when a large number of bits (e.g. for higher precision adders) are involved in the detection computation and gate delays are slow. Another drawback of prior Viterbi detection designs has been the provision of fixed reference levels (e.g. +1, 0, −1) for detection thresholds. In particular, a hitherto unsolved need has arisen for an improved Viterbi detector within a PR4, ML data channel overcoming these limitations and drawbacks.

SUMMARY OF THE INVENTION

A general object of the present invention is to provide an improved Viterbi detector within a PR4,ML data channel of a disk drive having programmable detection threshold levels.

Another general object of the present invention is to provide an efficient pipelined architecture for a Viterbi detector within a PR4, ML data channel for decoding (0,4,4) coded data with a feedback loop of only one clock cycle.

One more object of the present invention is to provide an improved error correction architecture within e.g. a disk drive by combining outputs of a Viterbi detector with error correction circuitry.

Yet another object of the present invention is to provide an improved defect mapping method and apparatus for use within a magnetic data storage device, such as a disk drive by providing a Viterbi detector within a PR4,ML data channel with programmable detection threshold levels, whereby detection thresholds may be set high in order to detect marginal data storage locations of the magnetic media.

In accordance with aspects of the present invention, a Viterbi detector for a PR4,ML data channel includes a data sample input for receiving digital data samples from a source. The data samples are taken of data which has been coded in a predetermined data code format and which has been passed through a data degrading channel. A delay circuit delays the data samples received at an data sample input. A delay selector controls an output of the delay circuit in accordance with a feedback control bit value. An adder circuit combines data samples from the data sample input with delayed samples from the delay circuit to produce a sum. A threshold input receives programmable positive and negative data threshold values. A threshold selector puts out either the positive or the negative data threshold values in accordance with a sign bit control value. A comparator compares the sum with a selected threshold value and puts out a logical value based upon comparison thereof. It includes Viterbi decision state logic for determining the control value, the feedback control bit value, and two raw data bits for each incoming data sample. A memory path circuit decodes a sequence of consecutive values of the raw data bits in accordance with a predetermined maximum likelihood trellis decode logic table related to the predetermined data code format and puts out a sequence of detected code bits.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS In the Drawings:

FIG. 5 is a simplified diagram of a recording pattern formed on a data storage surface of the FIG. 4 disk drive, illustrating data zones and embedded servo sector patterns.

FIG. 6 is an enlarged lineal depiction of a segment of one data track within the multiplicity of data tracks defined within the FIG. 5 data layout plan, illustrating one data field which has been split into segments by regularly occurring embedded servo sectors.

FIG. 6A is an enlarged diagrammatic representation of flux transitions comprising one of the embedded servo sectors of the FIG. 6 lineal data track segment depiction.

FIG. 6B is an enlarged diagrammatic representation of flux transitions comprising one of the data ID headers of the FIG. 6 lineal data track segment depiction.

FIG. 7 is a table summarizing the trellis decode logic states of a PR4,ML Viterbi detector within the FIG. 4 disk drive architecture.

FIG. 12 is a block diagram of another Viterbi detector in accordance with principles of the present invention in which the interleaves are decoded in pipelined fashion.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

System Overview

Figure 4:
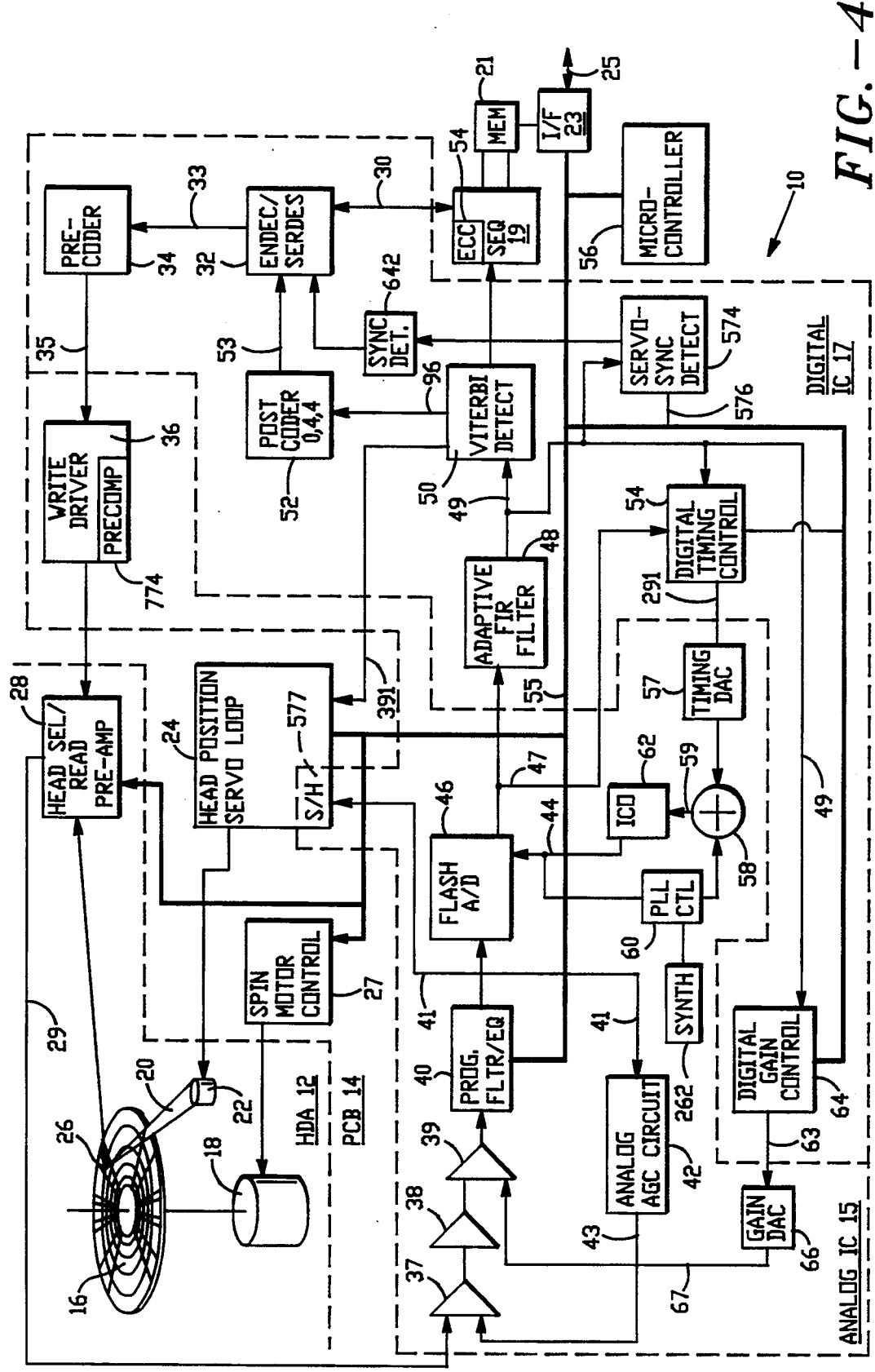
FIG. 4 is a simplified overall system block diagram of a disk drive including a PR4,ML write/read channel architecture incorporating principles and aspects of the present invention.

With reference to FIG. 4, an exemplary high performance, high data capacity, low cost disk drive 10 incorporating a programmable and adaptive PR4,ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. NO. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4,ML read/write channel application-specific integrated circuit (ASIC) 15, a digital PR4,ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 55 for controlling operations of the sequencer 19, interface 23, a servo loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include on-board and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4, ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head positioner, now U.S. Pat. No. 5,170,299, the disclosure thereof being hereby incorporated by reference.

Returning to FIG. 4, during playback, flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$.

Figure 1:
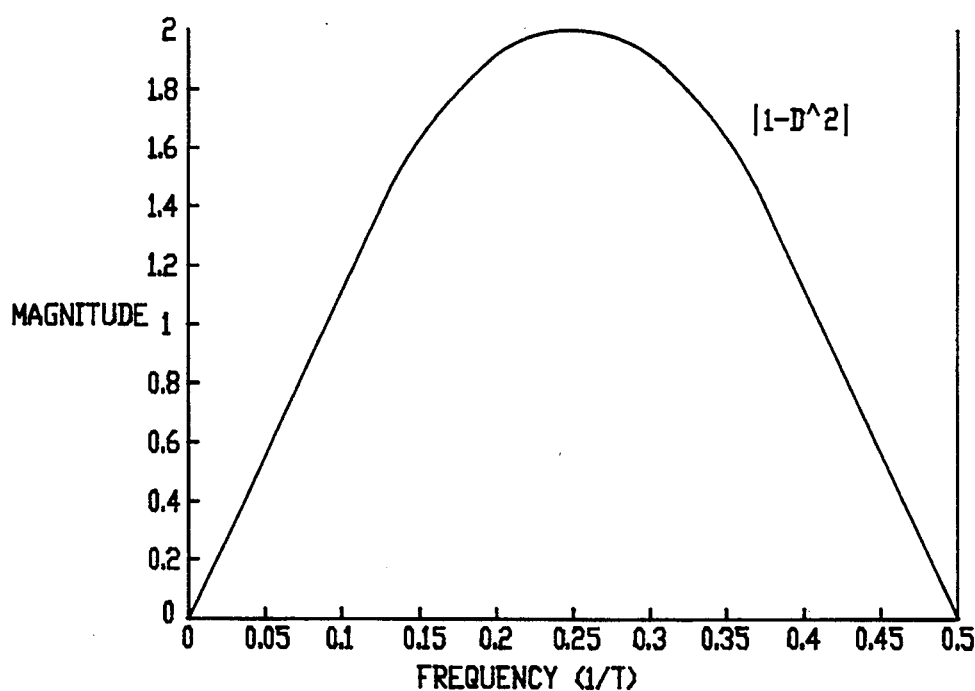
FIG. 1 is a graph of an idealized PR4 channel magnitude response spectrum.
Figure 3:
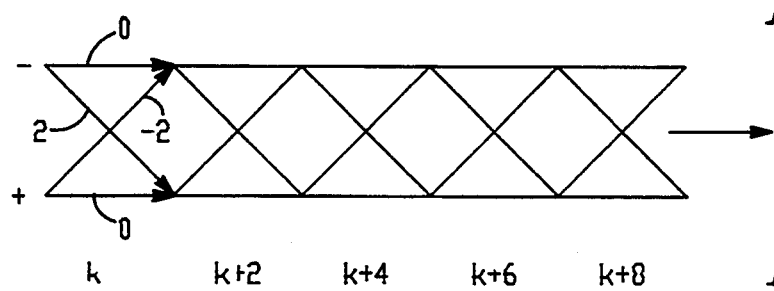
FIG. 3 is a trellis diagram employed by a Viterbi detector in detecting a maximum likelihood data sequence occurring within one interleave of a PR4 data stream.

The FIR filter 48 employs adaptive filter coefficients for filtering and conditioning the raw data samples $\{x_k\}$ in accordance with the desired PR4 channel response characteristics, as plotted in FIG. 1, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example.

At this stage, the decoded data put out on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples $\{x_k\}$ must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

Data Recording Pattern

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outmost zone 70-1, and radially inward zones 70-2, 70-3, 70-4, 70-5, 70-6, 70-7, 70-8, and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 5 also depicts a series of radially extending embedded servo sectors 68 which e.g. are equally spaced around the circumference of the disk 16. As shown in FIG. 6A, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors or fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the referenced, copending U.S. patent application Ser. No. 07/569,065.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field 50 segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

Figure 8:
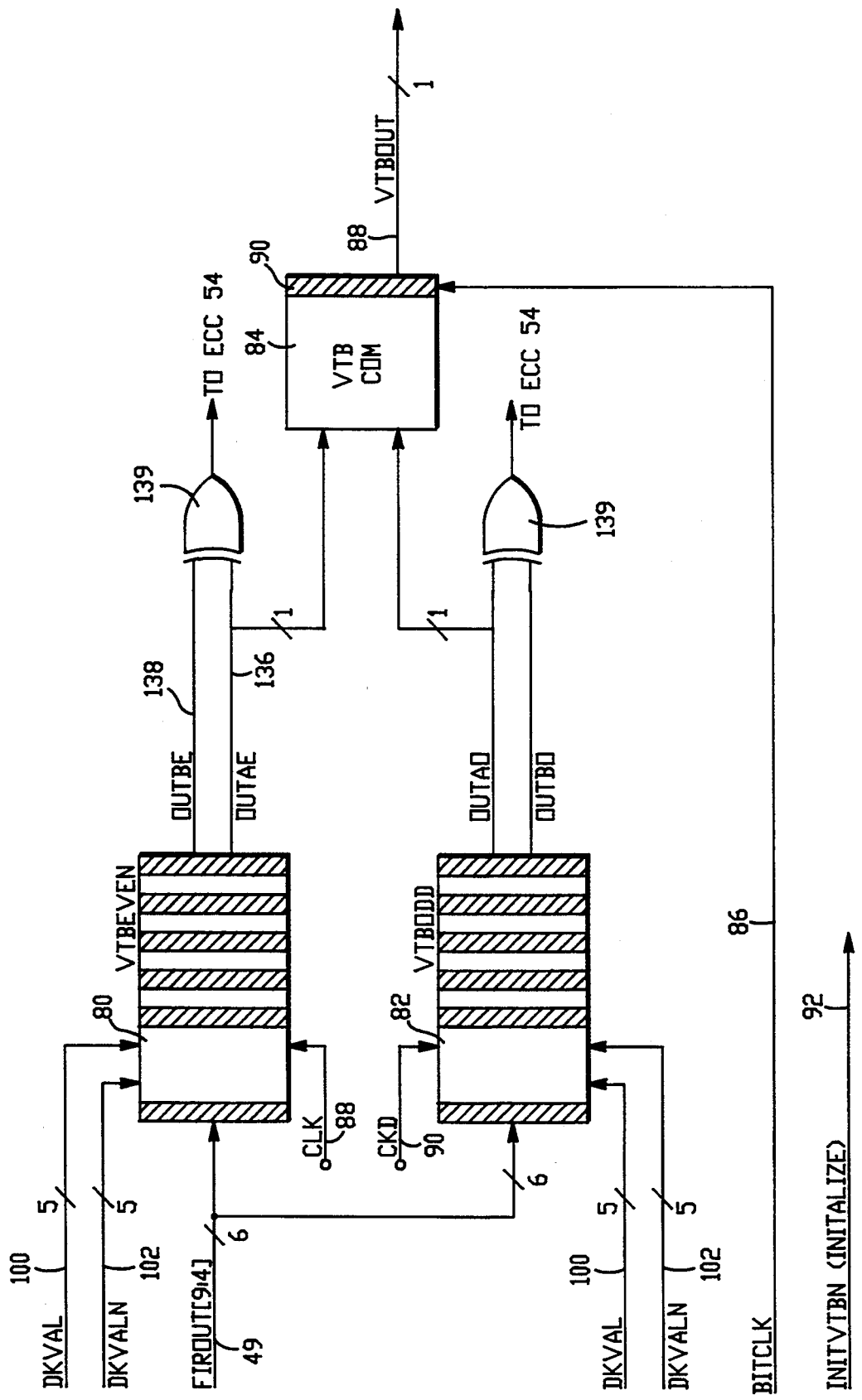
FIG. 8 is an overview block diagram of a Viterbi detector of the FIG. 4 disk drive architecture incorporating principles of the present invention.

The PR4 Viterbi detector 50 determines coded data values based upon the states tabulated in the FIG. 7 table. As shown in the FIG. 8 overview, the Viterbi detector 50 includes two identical interleave decoders: an even interleave decoder 80, and an odd interleave decoder 82. Each decoder 80, 82, receives incoming data via the path 49 from the adaptive FIR filter 48. A halved rate clock signal is used to clock each decoder 80, 82: e.g., a 36 MHz even interleave clock signal on a line 88 and a 36 MHz, phase reversed odd interleave clock signal on a line 90. Each interleave decoder 80, 82 provides two outputs: OutA and OutB. Under normal error free data decoding situations, the two outputs of each decoder 80 or 82 will be the same, so that only one of these outputs (e.g. OutA) is used for the data output.

In an error situation, OutA will not equal OutB, and this condition represents an error flag or pointer to an erasure or hole in the data stream. The error flag may advantageously be used by error correction circuitry 54 within the sequencer 19 as a location pointer to a data error requiring ECC intervention and correction on-the-fly. When the error burst location is known, the processing required of the ECC circuit 54 is accordingly limited to determination of error correction values; and, with burst error locations being determined by the Viterbi detector 50, more burst errors may be accommodated on-the-fly than with prior approaches. In this regard, commonly assigned U.S. Pat. No. 4,730,321, U.S. patent application Ser. No. 07/650,791 filed Feb. 1, 1991, U.S. Pat. No. 5,241,546 and U.S. patent application Ser. No. 07/820,283 filed Jan. 9, 1992, are pertinent, and the respective disclosures thereof are hereby incorporated herein by reference thereto.

The outputs from the interleave decoders 80 and 82 are alternatively selected by a 2:1 multiplexer 84 which provides a multiplexed output over a line 88 via a latch 90 which is clocked at the original BITCLK clocking rate (e.g. 72 MHz) on the path 86. The multiplexer 84 is selected by a signal derived e.g. from the even clock signal on the path 88.

Heretofore, practice has been to normalize the playback information external to the Viterbi detector, and prior designs have proceeded upon the assumption that the incoming information levels are either a positive constant, zero or a negative constant (e.g., $+1, 0, -1$). This prior approach has been used when transducers had substantially "under-shoot free" characteristics, such as the characteristics associated with magneto-resistive head technology. With this prior approach, adequate channel equalization has been achieved by using simple, programmable analog filters upstream of the analog to digital converter.

Even though the disk drive 10 employs zoned data recording in an effort to normalize flux densities across the radially expansive data storage surface, there are still variations in flux density from data zone to data zone. In order to take into account these variations and to permit use of e.g. thin film heads which may manifest substantial under-shoot in their response to recorded flux transitions, the adaptive digital FIR filter 48 is used. The amount of equalization performed in the adaptive FIR filter 48 will influence the optimal threshold levels used in the Viterbi detector in a system using fixed point arithmetic. These conditions have led to the present discovery that adjustment of the threshold levels within the Viterbi detector 50, as well as distributed gain level adjustments and signal normalization throughout the PR4, ML data channel, significantly improve overall data channel performance.

In addition, programmable threshold levels make the task of mapping media defects with the present PR4, ML read channel much easier. In carrying out defect mapping, the detection thresholds are raised incrementally by the controller 56 until the Viterbi detector 50 starts making detection errors. These errors will first occur only at marginal data storage locations on the disk 16. This capability thus provides a very effective media test which may be carried out by the disk drive itself, after assembly, and periodically during its useful lifetime.

The even and odd interleave decoders 80 and 82 are provided with two programmable threshold levels on lines 100 and 102, the line 100 carrying a programmable positive threshold level dkval, and the line 102 carrying a programmable negative threshold level dkvaln. The positive threshold on the line 100, and the negative threshold on the line 102 are programmable within amplitude ranges LP and LN. The positive and negative threshold programming values are preferably stored in on-board registers of the register file 804 of the digital chip 17. The microcontroller 56, during idle mode, will update the dkval registers for each different data zone 70-1 to 70-9, for example. Thus, the Viterbi detector 50 is tuned to a correct threshold operating condition for each particular data zone.

Figure 2:
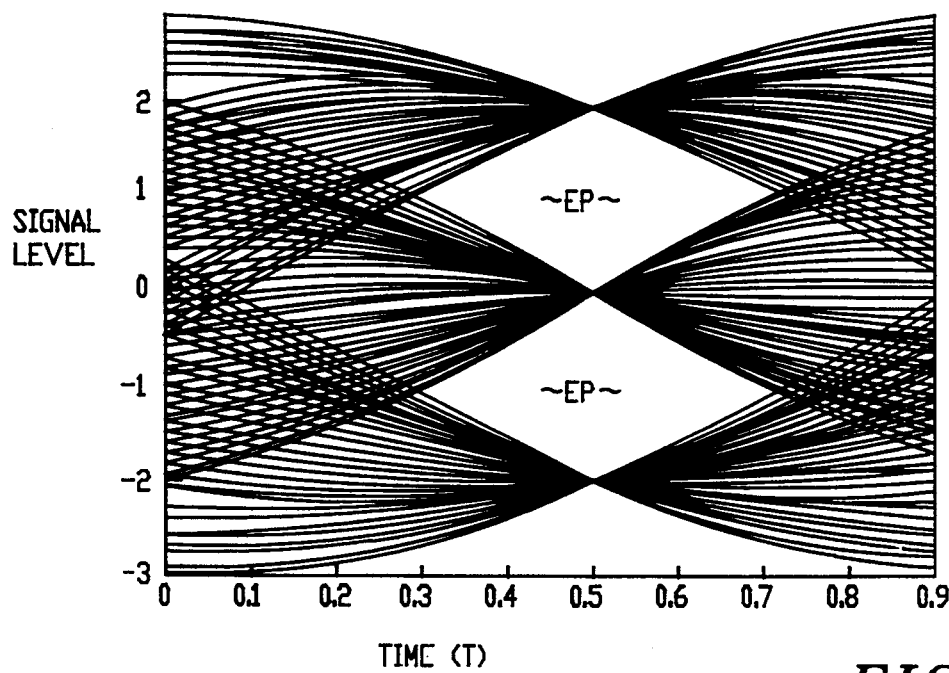
FIG. 2 is an exemplary ternary or "eye" diagram illustrating detection of signal levels in a PR4 channel.

The dkval settings are initially determined by the particular characteristics of the disk drive 10. In practice, the disk drive 10 is placed upon a test stand and tested to determine correct values for dkval for each zone. For example, a digital version of the ternary eye pattern EP FIG. 2, is observed upon an instrument and optimized (maximum vertical distance between levels) for each zone by adjustment of dkval. Each value is then recorded in firmware for the particular drive. The optimum dkval is one which enables the lowest error rate at the output of the Viterbi detector 50. This optimum level is often approximated by the particular dkval which achieves the highest signal to noise ratio at the output of the digital adaptive FIR filter 48. Further, the absolute values of the threshold ranges LP and LN are normally one half of the value of dkval, but the threshold ranges LP and LN are preferably programmable, so that the PR4, ML channel can be "marginalized" in order to determine its overall performance characteristics, and to carry out defect mapping, as explained above.

In order to start the Viterbi detector 50 at the proper time as well as to power down the detector 50 under program control, an initialization control signal INITVTBN is supplied over a line 90. The INITVTBN signal is an asynchronous clear pulse which is asserted before any user data arrives.

Figure 9:
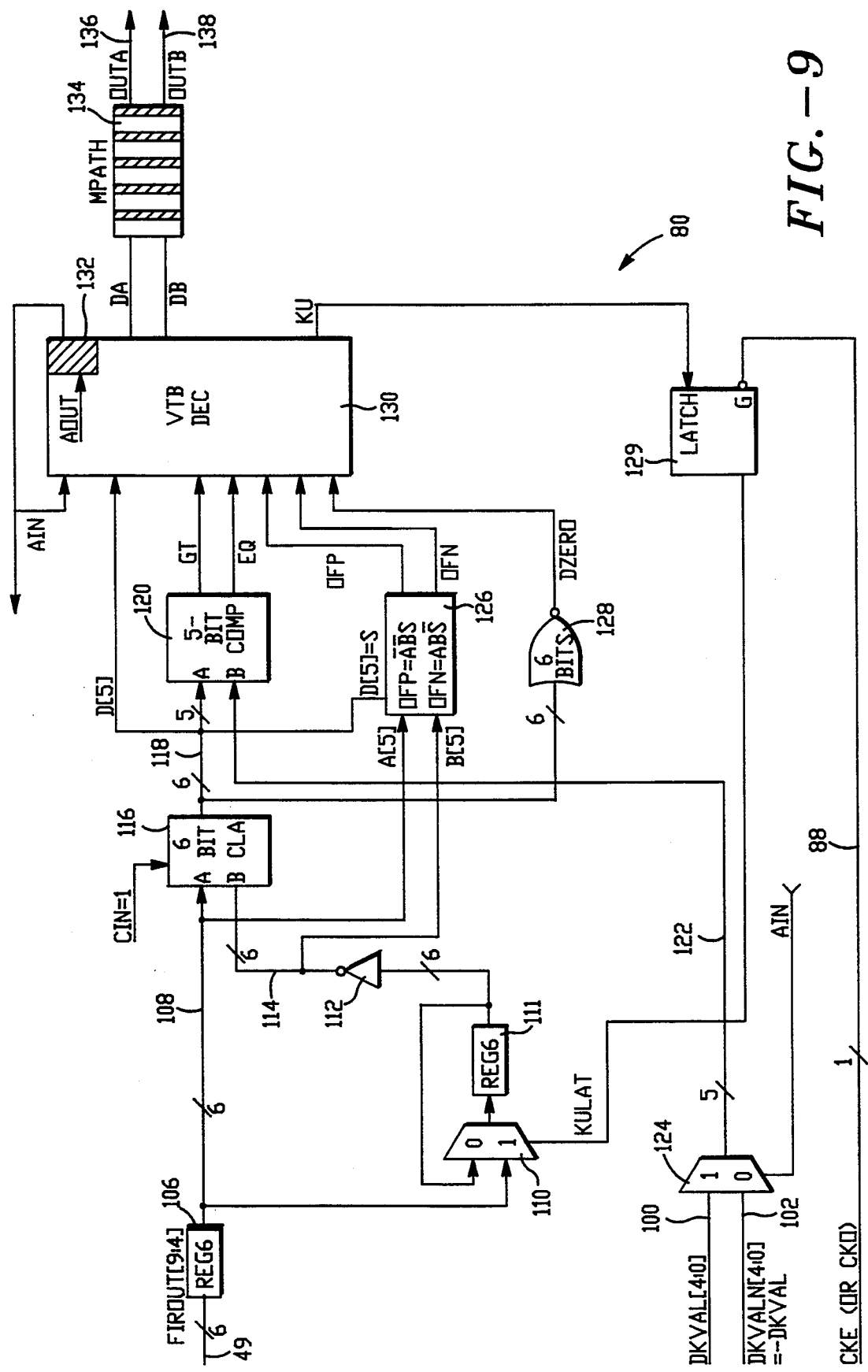
FIG. 9 is a more detailed block diagram of one interleave decoder circuit within the FIG. 10 Viterbi detector.

Turning now to FIG. 9, the even interleave decoder 80 is depicted, although its description equally applies to the identical odd interleave decoder 82 which operates on the odd clock cycle CKO in the same manner as the even interleave decoder on the even clock cycle CKE. The incoming information stream from the adaptive FIR filter 48 enters the even interleave decoder 80 over the path 49 and is latched into a clock delay register 106. A latched output on a path 108 enter a 6 bit carry-lookahead-adder (CLA) circuit 116 which functions as a very fast addition processor. An output from the register 106 is selected by a multiplexer 110 and delayed by a register 111 and then inverted by an inverter 112. The output from the inverter 112 enters the adder 116 on a path 114. The adder 116 adds an incoming six bit information value on the path 108 with an inverted and one bit cycle delayed value on the path 114, to produce a six bit sum on a path 118. The output from the register 111 is fed back to the multiplexer 110, thereby creating a latch for holding the present value.

The sum put out over the path 118 enters a five-bit comparator 120. The comparator compares the low five bit positions of the sum value on the path 118 with a multiplexed, selected threshold value (dkval or dkvaln) on a path 122 which is obtained from a multiplexer 124. The multiplexer 124 receives the positive threshold value dkval on the path 100 and the negative threshold value dkvaln on the path 102 and alternately selects between the threshold values in accordance with a present state value ain put out by a latch 132 in conjunction with operation of a decision state machine 130 described below.

Thus, for each incoming information value, and for each threshold value, the comparator 120 puts out a greater-than value (GT) or an equal value (EQ). Overflow of the adder 116 is detected by an overflow circuit 126, which puts out an overflow-positive value (OFP) and an overflow-negative value (OFN) to the decision state machine 130. A zero sum detection circuit 128 determines if the output from the adder 116 is all zeros, and if so, puts out a zero detection value (DZERO) to the decision state machine 130. A value ku put out by the state machine 130 is fed into a latch 129, and the output thereof kulat is used to control the multiplexer 110.

In summary, the summed high order data bit value D5 on the path 118, the GT, LT, OFP, OFN, DZERO and the ain values are put into the Viterbi decision state machine 130. The state machine 130 provides four signals: aout, da, db and ku, in accordance with the following program expressed in pseudo-code, as follows:

```
module 130 (ai,gt,eq,d5,ofp,ofn,dzero,aout,ku,da,db);
input ai,gt,eq,d5,ofp,ofn,dzero;
output aout,ku,da,db;
begin
    if (ai=1)
            if (((!eq · gt)+(eq ·!gt)) · !d5 · !ofn + ofp)
                    decode = 0100;
            else if ((dzero) + (d5 · !ofp) + (ofn))
                    decode = 1111
            else
                    decode = 1010;
    else
            if ((!d5 · !ofn) + ofp)
                    decode = 0100;
            else if (((!eq · !gt) + (eq · !gt)) · d5 · !ofp + ofn)
                    decode = 1111;
            else
                    decode = 0010
end
{aout, ku,da,db} = decode;
endmodule
```

The aout output from the decision state machine 130 is held in the latch 132 and clocked as the ain input to the state machine 130 and applied to control the multiplexer 124, in accordance with the initialization signal on the path 90.

Two data outputs, da and db, from the state machine 130 are sent into a memory path circuit (MPATH) 134 which implements for the particular interleave a trellis decode logic table (FIG. 7). In the FIG. 7 table, the following values have the indicated meanings:

ain=present state aout=next state (this value is clocked into the flip-flop 132 and becomes ain for the next clock cycle)

y(k)=present data sample y(k-M)=sampling data delayed by M unit cycles da, db=outputs of the Viterbi detector 50 ku=output of the Viterbi detector 50; this value is also used to control the value of M by enabling of disabling the clock of the register 110.

Figure 10:
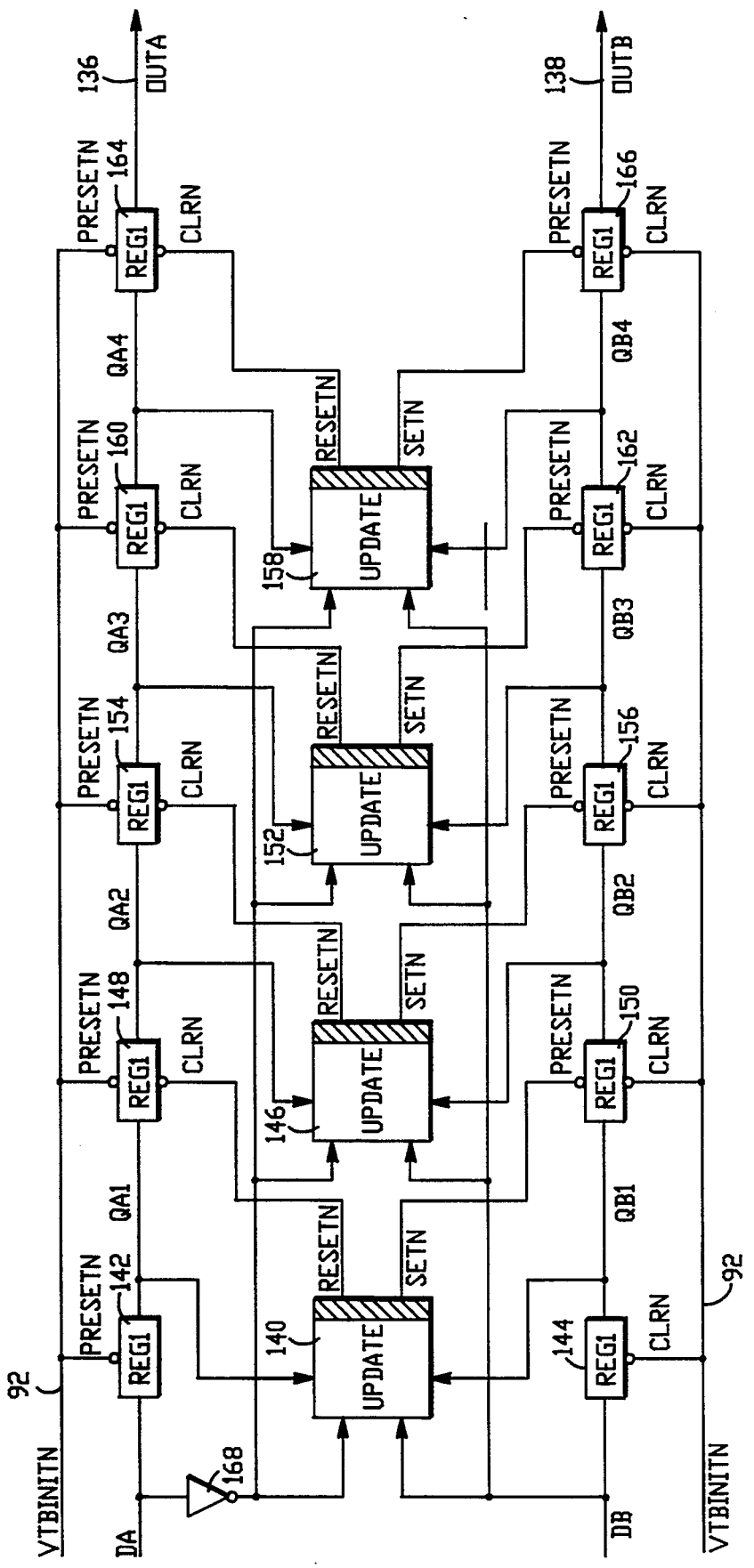
FIG. 10 is a detailed block diagram of a memory path circuit within the FIG. 9 interleave decoder circuit.

The MPATH circuit 134 is preferably implemented as shown in FIG. 10. The circuit 134 is clocked at the interleave clock rate (e.g. 36 MHz) on the path 88, and it is in the present example implemented with four pipeline update stages 140, 146, 152 and 158, and five pairs of registers 142–144, 148–150, 154–156, 160–162. and 164–166. Five register pairs stages are used in order to satisfy the (0,6,5) code condition present at this location of the read channel.

Registers 142 and 144 provide outputs which are fed into update stage 140; registers 148 and 150 provide outputs which are fed into update stage 146; registers 154 and 156 provide outputs which are fed into update stage 152; and, registers 160 and 162 provide outputs which are fed into update stage 158. Registers 164 and 166 provide respectively the two Viterbi detector outputs OUTA and OUTB on the lines 136 and 138. Reset outputs of the update circuits 140, 146, 152 and 158 respectively clear registers 148, 154, 160 and 164, while set outputs of the same update circuits respectively preset registers 150, 156, 162 and 166. The initialization signal on the path 92 presets registers 142, 148, 154, 160 and 164, and clears registers 144, 150, 156, 162 and 166. An inverter 168 inverts the incoming da signal and supplies an inverse thereof as an input to the update circuits 140, 146, 152 and 158. the incoming db signal is provided directly as an input to the update circuits 140, 146, 152 and 158.

A logical decision will be made by the memory path circuit 134 upon incoming data within six clock cycles. Inputs da and db may have respective values of 00, 10 and 11. An input value of 01 is illegal and should not ever be present in the case of error free data. If the da and db inputs are respectively 00, the data is valid, and a decision is immediately reached that the data value is zero. If the input values are respectively 11, the data is again converged, and the data value is determined to be one. If the respective incoming da and db value are 10, the ultimate data value cannot be determined as the data paths are not converged, and so this data propagates from the first stage to the second stage, and so forth, until convergence occurs, at which point the data value is determined to be either zero or one. Operation of the MPATH circuit 134 is essentially in accordance with the values set forth in the table of FIG. 7.

Each of the logic update circuits 140, 146, 152, and 158 executes the same logical equations. There are four inputs to each update circuit: $\overline{Qa}$, $Qb$, $\overline{da}$ and $db$. There are two outputs from each update circuit: $\overline{reset}$ and $\overline{set}$ which reset and set each pair of subsequent registers in accordance with the following equations:

$$\overline{RESET} = \overline{da \cdot QA \cdot \overline{QB}}$$

$$\overline{SET} = \overline{db \cdot QA \cdot \overline{QB}}$$

Ordinarily, for valid data, the outputs OUTA and OUTB on the paths 136 and 138 will be the same value. If there is no convergence within four clock cycles through the MPATH circuit 134, a data error condition (inequality) exists at the outputs 136 and 138. This inequality or "erasure flag" can be easily tested by an exclusive-OR gate 139 and used to signal the error correction circuitry 54 that a data error location has been located. The ECC circuitry 54 then need only calculate the error value for that location, using a simplified and more rapidly executed on-the-fly error correction procedure.

Figure 11:
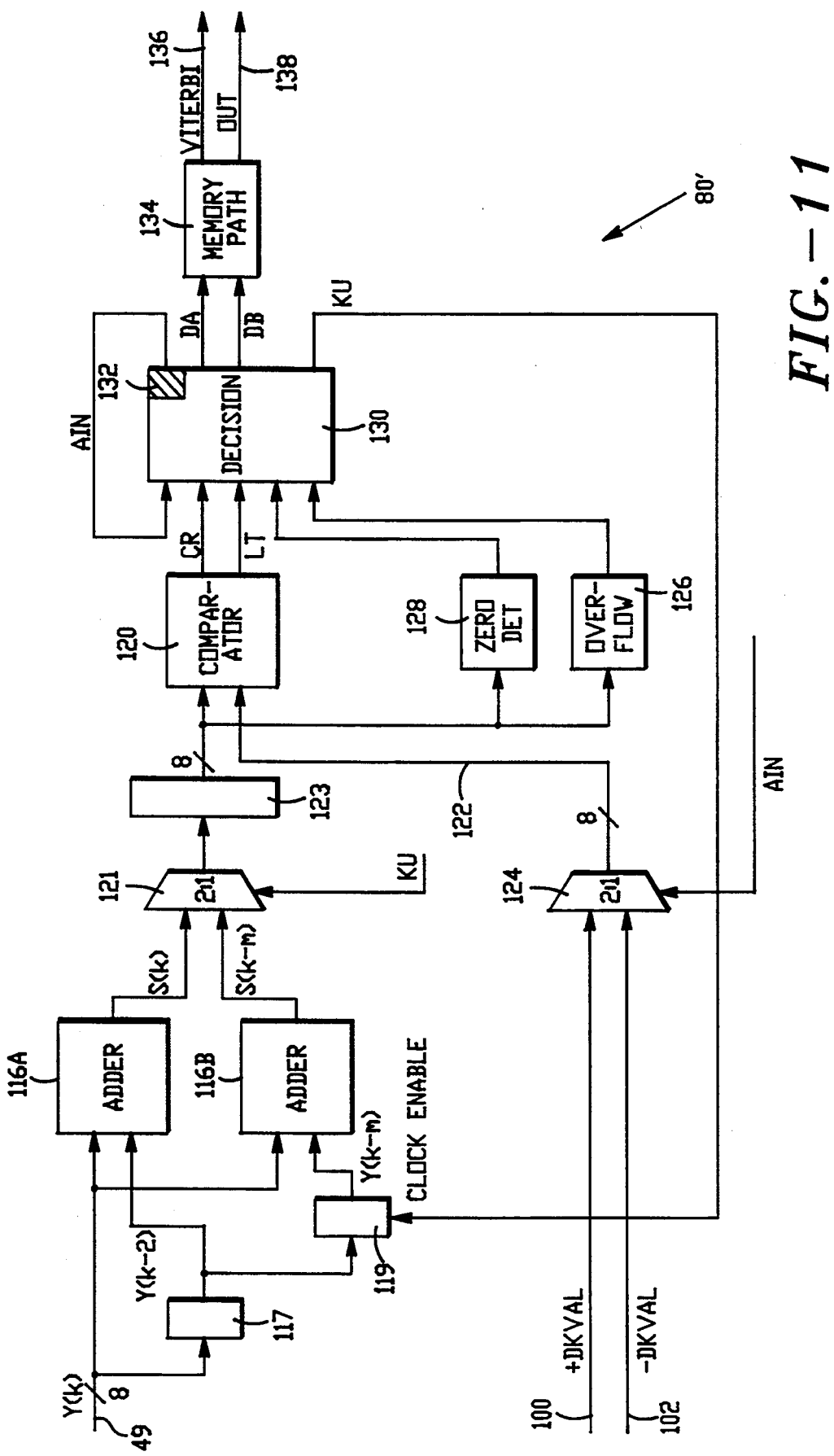
FIG. 11 is a block diagram of an alternative embodiment of a pipelined Viterbi interleaved decoder circuit similar to FIG. 9.

FIG. 11 sets forth an alternative embodiment of interleave decoder 80' which is similar to the decoder 80 depicted in, and described above in conjunction with, FIG. 9. The same elements have the same reference numerals. The alternative decoder 80' illustrates a preferred way to implement a pipeline architecture which enables implementation of the adder circuits 116a and 116b with slower logic. In this circuit, there is still only one feedback delay cycle between the feedback control output ku of the decision circuit 130 and the input. In this alternative architecture, the incoming conditioned data samples [Yk] on the path 49 from the FIR filter 48 are applied directly as one input to two adders 116a and 116b. A first clock cycle delay register 117 delays a second input to the first adder 116a by one clock cycle and provides a one clock cycle delayed input to a second clocked delay register 119. The second delay register 119 is clocked by the feedback control output ku from the decision circuit 130, which results in a single clock delay period of feedback control. A multiplexer 121 selects alternatively between the outputs from the adders 116a and 116b in accordance with the feedback control output ku. A register 123 delays the selected sum by a clock cycle and forwards the delayed sum of the comparator 120. The balance of the circuit 80' is the same as described in FIG. 9.

FIG. 12 sets forth a Vitetbi detector 50' which provides a single structure, clocked at the bit clock rate of the data samples {Yk}, for handling both interleaves of the PR4, ML data samples. In this embodiment, two delay registers 115 and 117 are connected to the input 49 to delay the incoming data samples by two clock period delays. The twice delayed samples are summed with the undelayed samples in a first adder 116a. The twice delayed samples are also applied to two single-clock delay registers 119a and 119b. The register 119a is clocked at an odd interleave clock rate CKO (which is half the bit clock rate), while the register 119b is clocked at an even interleave clock rate CKE (which is half the bit clock rate and which is phase reversed from the odd rate CKO). The delay register 119a is clocked by a feedback control KULATA from a latch 129a, while the delay register 119b is clocked by a feedback control KULATB from a latch 129b. The latches 129a and 129b latch the feedback control ku from the decision circuit. The latch 129a is clocked at the odd interleave clock rate CKO, while the latch 129b is clocked at the even interleave clock rate CKE. Outputs from the latches 119a and 119b are selected by a multiplexer 113 clocked e.g. at the CKE clock rate. These outputs provide a second input to the second adder circuit 116b. Outputs from the adders 116a and 116b are selected by a 2:1 selector 121 in accordance with the feedback control signal Ku. Two pipeline delay registers 123 and 125 delay the selected sum by two clock periods before it arrives at the comparator 120. The rest of the circuit 50' is the same as described in conjunction with FIG. 9 with the exception that the elements 120, 126, 128 130, 132 and 134 are clocked at the bit clock rate of the data samples {Yk}.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An interleave decoder within a Viterbi detector for a partial response class IV, maximum likelihood data channel comprising:
    a data sample input for receiving filtered and equalized digital data samples from a source thereof, the data samples taken of data which has been coded in a predetermined data code format and which has been passed through a data degrading channel,
    delay means for delaying the data samples received at the data sample input to produce delayed data samples,
    delay selector means for controlling an output of the delay means in accordance with a feedback control bit value,
    adder means for combining data samples from the data sample input with the delayed data samples from the delay means to produce a sum,
    a threshold input for receiving programmable positive and negative data threshold values,
    threshold selector means for selectively putting out the positive and negative data threshold values in accordance with a sign bit control value,
    comparator means for comparing the sum with a selected one of the threshold values and for putting out a logical value based upon comparison thereof,
    Viterbi decision state logic means for determining the sign bit control value, the feedback control bit value, and two raw data bits for each incoming data sample,
    memory path means for decoding a sequence of consecutive values of said two raw data bits per incoming sample in accordance with a predetermined maximum likelihood trellis decode logic table related to said predetermined data code format and for thereupon putting out a sequence of detected code bits.

2. The interleave decoder set forth in claim 1 wherein the memory path means decodes and puts out a pair of detected code bits for each incoming data sample, and wherein the interleave decoder further comprises non-equivalence detection means connected to an output of the memory path means for determining equivalence between each said pair of detected code bits and for signalling error correction coding circuitry means a data location of a detected occurrence of non-equivalence of a said pair of detected code bits.

3. The interleave decoder set forth in claim 1 wherein said delay means includes a clock cycle delay latch having an output fed back to one input of said delay selector means, and an inverter means for inverting the output of the clock cycle delay latch and or feeding the inverted output as delayed samples to said adder means.

4. The interleave decoder set forth in claim 1 further comprising a feedback control bit latch means for latching said feedback control bit value put out by said Viterbi decision state logic means, there being a single decoder clock cycle delay between the Viterbi decision state logic means and the delay selector means.

5. The interleave decoder set forth in claim 1 wherein said adder means comprises a first adder and a second adder, both of which have one input connected to said data sample input, the delay means comprises a first delay latch means connected between the data sample input and a delay input of the first adder, and a second latched delay means connected between the first delay means and a delay input of the second adder, and further including selector means controlled by said feedback control bit value for selecting and putting out a sum from one of the first adder and second adder, and pipeline path delay means between the selector means and the comparator means.

6. The interleave decoder set forth in claim 1 wherein the comparator means includes overflow detection means for detecting an overflow condition and for providing the overflow condition to the Viterbi decision state logic means and zero condition detection means for detecting a zero sum condition and for providing the zero sum condition to the Viterbi decision state logic means.

7. The interleave decoder set forth in claim 1 wherein the predetermined data code format comprises (0,4,4) code, and wherein the memory path means comprises five pipeline register stages and four comparison stages.

8. The interleave decoder set forth in claim 7 wherein each comparison stage sets and resets an associated pipeline register stage in accordance with the relations:

$$\overline{RESET} = \overline{da} \cdot \overline{QA} \cdot \overline{QB}$$

$$\overline{SET} = \overline{db} \cdot \overline{QA} \cdot \overline{QB}$$

where da and db comprise said two raw data bits, and wherein QA and QB are resultant data bits taken at outputs of said five pipeline register stages.

9. The interleave decoder set forth in claim 1 comprising an odd interleave decoder within a Viterbi detector and wherein an even interleave decoder of the Viterbi detector comprises the same structural elements and relationships as said odd interleave decoder, and further comprising odd interleave clocking means for generating an odd interleave clocking signal, even interleave clocking means for generating an even interleave clocking signal phase having the same rate as, and being phase reversed with said odd interleave clocking signal, and combiner means for combining outputs from the odd interleave decoder and the even interleave decoder, the combiner means having an output clocked at a data sample clocking rate at twice a rate of the odd and even interleave clocking signals.

10. A Viterbi detector for a partial response class IV, maximum likelihood data channel comprising:
    a data sample input for receiving digital data samples from a source thereof, the data samples taken of data which has been coded in a predetermined data code format and which has been passed through a data degrading channel,
    an odd interleave Viterbi decoder, and an even interleave Viterbi decoder, each decoder being clocked at a rate one half of a data sample clocking rate and including:
        delay means for delaying the data samples received at the data sample input to produce delayed data samples,
        delay selector means for controlling an output of the delay means in accordance with a feedback control bit value,
        adder means for combining data samples from the data sample input with the delayed data samples from the delay means to produce a sum, a threshold input for receiving programmable positive and negative data threshold values, threshold selector means for selectively putting out the positive and negative data threshold values in accordance with a sign bit control value, comparator means for comparing the sum with a selected one of the threshold values and for putting out a logical value based upon comparison thereof, Viterbi decision state logic means for determining the sign bit control value, the feedback control bit value, and two raw data bits for each incoming data sample, memory path means for decoding a sequence of consecutive values of said two raw data bits per incoming data sample in accordance with a predetermined maximum likelihood trellis decode logic table related to said predetermined data code format and for thereupon putting out a sequence of detected code bits for said interleave, the Viterbi detector further including combiner means for combining the outputs from the odd interleave Viterbi decoder and the even interleave Viterbi decoder, the combiner means having an output clocked at the data sample clocking rate.

11. A Viterbi detector for a partial response class IV, maximum likelihood data channel comprising:

a data sample input for receiving digital data samples from a source thereof, the data samples taken of data which has been coded in a predetermined data code format and which has been passed through a data degrading channel, delay means for delaying the data samples received at the data sample input to provide delayed data samples, delay selector means for controlling an output of the delay means in accordance with a feedback control bit value, adder means for combining data samples from the data sample input with the delayed data samples from the delay means to produce a sum, a threshold input for receiving programmable positive and negative data threshold values, threshold selector means for selectively putting out the positive and negative data threshold values in accordance with a sign bit control value, comparator means for comparing the sum with a selected one of the threshold values and for putting out a logical value based upon comparison thereof, Viterbi decision state logic means for determining the sign bit control value, the feedback control bit value, and two raw data bits for each incoming data sample, memory path means for decoding a sequence of consecutive values of said two raw data bits per data sample in accordance with a predetermined maximum likelihood trellis decode logic table related to said predetermined data code format and for thereupon putting out a sequence of detected code bits.

12. The interleave decoder set forth in claim 6 wherein the Viterbi decision state logic means operates in accordance with the following relations:

| Present State ain | $D = y(c) - Y(k-m)$ | Outputs da | db | ku | New State aout |
|---|---|---|---|---|---|
| 1 | $D \geq dkval$ | 0 | 0 | 1 | 0 |
| 1 | $D \leq 0$ | 1 | 1 | 1 | 1 |
| 1 | $0 < D < dkval$ | 1 | 0 | 0 | 1 |
| 0 | $D \geq 0$ | 0 | 0 | 1 | 0 |
| 0 | $D \leq dkvaln$ | 1 | 1 | 1 | 1 |
| 0 | $dkvaln < D < 0$ | 1 | 0 | 0 | 0, | wherein ain represents the sign bit control value, ku represents the feedback control bit, da and db represent the two raw data bits, and aout represents a new state value.

13. The interleave decoder set forth in claim 12 wherein the Viterbi decision state logic means includes an internal present state clocked latch means for latching the new state aout and for putting out Viterbi decision state logic means as an input.

* * * * *